United States Patent
Kumagai

(10) Patent No.: US 10,348,870 B2
(45) Date of Patent: Jul. 9, 2019

(54) INFORMATION PROCESSING APPARATUS, ELECTRONIC APPARATUS, AND CONTROL METHOD THEREFOR

(71) Applicant: CANON KABUSHIKI KAISHA, Tokyo (JP)

(72) Inventor: Atsushi Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 14/952,483

(22) Filed: Nov. 25, 2015

(65) Prior Publication Data

US 2016/0156721 A1 Jun. 2, 2016

(30) Foreign Application Priority Data

Nov. 27, 2014 (JP) ................................. 2014-240364

(51) Int. Cl.
*G06F 15/16* (2006.01)
*H04L 29/06* (2006.01)
*H04L 29/08* (2006.01)

(52) U.S. Cl.
CPC .............. *H04L 69/24* (2013.01); *H04L 67/34* (2013.01)

(58) Field of Classification Search
None
See application file for complete search history.

(56) References Cited

U.S. PATENT DOCUMENTS

| 9,426,185 B1* | 8/2016 | Vora ..................... H04L 65/1069 |
| 2013/0036231 A1* | 2/2013 | Suumaki ................. H04L 63/18 709/228 |
| 2013/0065526 A1* | 3/2013 | Pottier .................... H04L 67/34 455/41.2 |
| 2014/0028817 A1* | 1/2014 | Brockway, III .... H04N 5/23206 348/61 |
| 2015/0079970 A1* | 3/2015 | Delgado Campos ........................ H04W 12/12 455/421 |
| 2015/0089222 A1* | 3/2015 | White ................. H04L 63/0428 713/168 |
| 2015/0103663 A1* | 4/2015 | Amini ............... H04W 28/0215 370/235 |

FOREIGN PATENT DOCUMENTS

| JP | 2007-526676 A | 9/2007 |
| WO | 2005/069769 A2 | 8/2005 |

* cited by examiner

*Primary Examiner* — Hamza N Algibhah
*Assistant Examiner* — Anthony T Rotolo
(74) *Attorney, Agent, or Firm* — Cowan, Liebowitz & Latman, P.C.

(57) ABSTRACT

An information processing apparatus comprises a connection unit being connectable to an electronic apparatus using a first communication method or a second communication method, a receiving unit that receives, from the electronic apparatus via the second communication method, information indicating a capability of software for communication with the electronic apparatus using the first communication method, a determination unit that determines whether software of the information processing apparatus meets the capability, an acquiring unit that, if the software of the information processing apparatus does not meet the capability, acquires software that meets the capability via a network using a third communication method, and a control unit that enables the communication with the electronic apparatus using the first communication method after the software that meets the capability is acquired.

16 Claims, 11 Drawing Sheets

SOFTWARE IS BEING UPDATED.
PLEASE KEEP CAMERA CLOSE TO
TERMINAL AND WAIT UNTIL
THE UPDATE IS COMPLETED.

CONNECTION TO CAMERA FAILED.
PLEASE PUT CAMERA CLOSER TO
TERMINAL AGAIN AND TRY TO
ESTABLISH CONNECTION.

OK

INFORMATION PROCESSING APPARATUS, ELECTRONIC APPARATUS, AND CONTROL METHOD THEREFOR

BACKGROUND OF THE INVENTION

Field of the Invention

The present invention relates to a network connection control technique.

Description of the Related Art

Information processing apparatuses such as mobile phones that are so-called smartphones have a wireless communication function of connecting to the wide area network (WAN) such as 3G or LTE in order to connect to the Internet. Furthermore, the smartphones have the function of performing communication via a wireless LAN such as Wi-Fi in order to connect faster to the Internet in an environment in which there is a wireless LAN access point, for example, indoors.

On the other hand, there are also electronic apparatuses such as digital cameras that can use the wireless LAN in order to facilitate data communication with a smartphone or the like. By using the wireless LAN, such a digital camera can transfer image data and the like to a smartphone without connecting thereto via a communication cable.

Furthermore, some electronic apparatus such as digital cameras have a wireless LAN access point function. By having the wireless LAN access point function, a digital camera can be connected to a smartphone via the wireless LAN even in an environment in which there is no wireless LAN access point to which the digital camera and the smartphone are connectable, for example, at the place where the user thereof has gone to.

Furthermore, smartphones have the function of acquiring an update program for application software or the like from a server on the Internet and automatically updating the software. Particularly, in a case of software that connects to an external service or device, processing is often performed in which capability information of the software that is needed for using the service or the device is acquired from the connection destination, and updating the software depending on the acquired capability information (see Japanese Patent Laid-Open No. 2007-526676).

Ordinarily, the wireless communication function of the information processing apparatuses such as smartphones is a function of connecting to the Internet. Accordingly, even in the case where an information processing apparatus is connected to the wide area network such as 3G or LTE, if the faster wireless LAN communication is available, the wide area network connection is automatically disconnected and switched to the wireless LAN connection. On the other hand, even in the case of the electronic apparatus having the wireless LAN access point function as represented by the above-described digital camera, there is the case where the apparatus itself does not have the function of connecting to the Internet. For example, when the smartphone performs wireless LAN connection to a wireless LAN access point formed by such an electronic apparatus, the wide area network connection is automatically disconnected and the smartphone is in the state in which it is not connected to the Internet. Accordingly, the smartphone in the state of not being connected to the Internet cannot access a server on the Internet that provides an update program even when software needs to be updated, and cannot update the software.

SUMMARY OF THE INVENTION

The present invention has been made in consideration of the aforementioned problems, and realizes a technique for making it possible to appropriately update software for use in communication between an information processing apparatus and an electronic apparatus.

In order to solve the aforementioned problems, the present invention provides an information processing apparatus comprising: a connection unit configured to be connectable to an electronic apparatus using a first communication method or a second communication method; a receiving unit configured to receive, from the electronic apparatus via the second communication method, information indicating a capability of software that is needed for communication with the electronic apparatus using the first communication method; a determination unit configured to determine whether or not software of the information processing apparatus meets the capability; an acquiring unit configured, if it is determined by the determination unit that the software of the information processing apparatus does not meet the capability, to acquire software that meets the capability via a network using a third communication method; and a control unit configured to enable the communication with the electronic apparatus using the first communication method after the software that meets the capability is acquired.

In order to solve the aforementioned problems, the present invention provides an information processing apparatus comprising: a connection unit configured to be connectable to an electronic apparatus using a first communication method or a second communication method; a receiving unit configured to receive, from the electronic apparatus, information indicating a capability of software that is needed for communication with the electronic apparatus using the second communication method; a determination unit configured to determine whether or not software of the information processing apparatus meets the capability; an acquiring unit configured, if it is determined by the determination unit that the software of the information processing apparatus does not meet the capability, to acquire software that meets the capability using the second communication method; and a control unit configured to enable communication with the electronic apparatus using the first communication method after the software that meets the capability is acquired.

In order to solve the aforementioned problems, the present invention provides an electronic apparatus comprising: a first communication unit configured to be connectable to an information processing apparatus; a transmitting unit configured to transmit, to the information processing apparatus via a second communication method, information indicating a capability of software that is needed for communication with the electronic apparatus using the first communication unit; and a control unit configured to disable the communication with the information processing apparatus by the first communication unit until a response indicating that software of the information processing apparatus meets the capability is received from the information processing apparatus using the second communication method.

In order to solve the aforementioned problems, the present invention provides a control method of an information processing apparatus that is connectable to an electronic apparatus using a first communication method or a second communication method, the control method comprising: receiving, from the electronic apparatus via the second communication method, information indicating a capability of software that is needed for communication with the electronic apparatus using the first communication method; determining whether or not software of the information processing apparatus meets the capability; acquiring, if it is determined that the software of the information processing apparatus does not meet the capability, software that meets the capability via a network using a third communication method; and enabling the communication with the electronic apparatus using the first communication method after the software that meets the capability is acquired.

In order to solve the aforementioned problems, the present invention provides a control method of an information processing apparatus that is connectable to an electronic apparatus using a first communication method or a second communication method, the control method comprising: receiving, from the electronic apparatus, information indicating a capability of software that is needed for communication with the electronic apparatus using the second communication method; determining whether or not software of the information processing apparatus meets the capability; acquiring, if it is determined that the software of the information processing apparatus does not meet the capability, software that meets the capability using the second communication method; and enabling communication with the electronic apparatus using the first communication method after the software that meets the capability is acquired.

In order to solve the aforementioned problems, the present invention provides a control method of an electronic apparatus that is connectable to an information processing apparatus using a first communication method, the control method comprising: transmitting, to the information processing apparatus via a second communication method, information indicating a capability of software that is needed for communication with the electronic apparatus using the first communication method; and disabling the communication with the information processing apparatus using the first communication method until a response indicating that software of the information processing apparatus meets the capability is received from the information processing apparatus using the second communication method.

According to the present invention, it is possible to appropriately update software for use in communication between an information processing apparatus and an electronic apparatus.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following will describe a system in which a smartphone, which is a kind of a mobile phone, is connected in a communicable manner to a digital camera via a wireless LAN access point of the digital camera, the smartphone and the digital camera being used as an information processing apparatus and an electronic apparatus of the present invention. The information processing apparatus and the electronic apparatus are of course not limited to the above-described examples. For example, the information processing apparatus may be a so-called tablet device, a personal computer, or a television, printer, or the like that is connectable to a wide area network such as the Internet. Furthermore, the electronic apparatus may be a tablet device, a smartphone, a music player, a printer, or the like.

System Configuration

Figure 1:
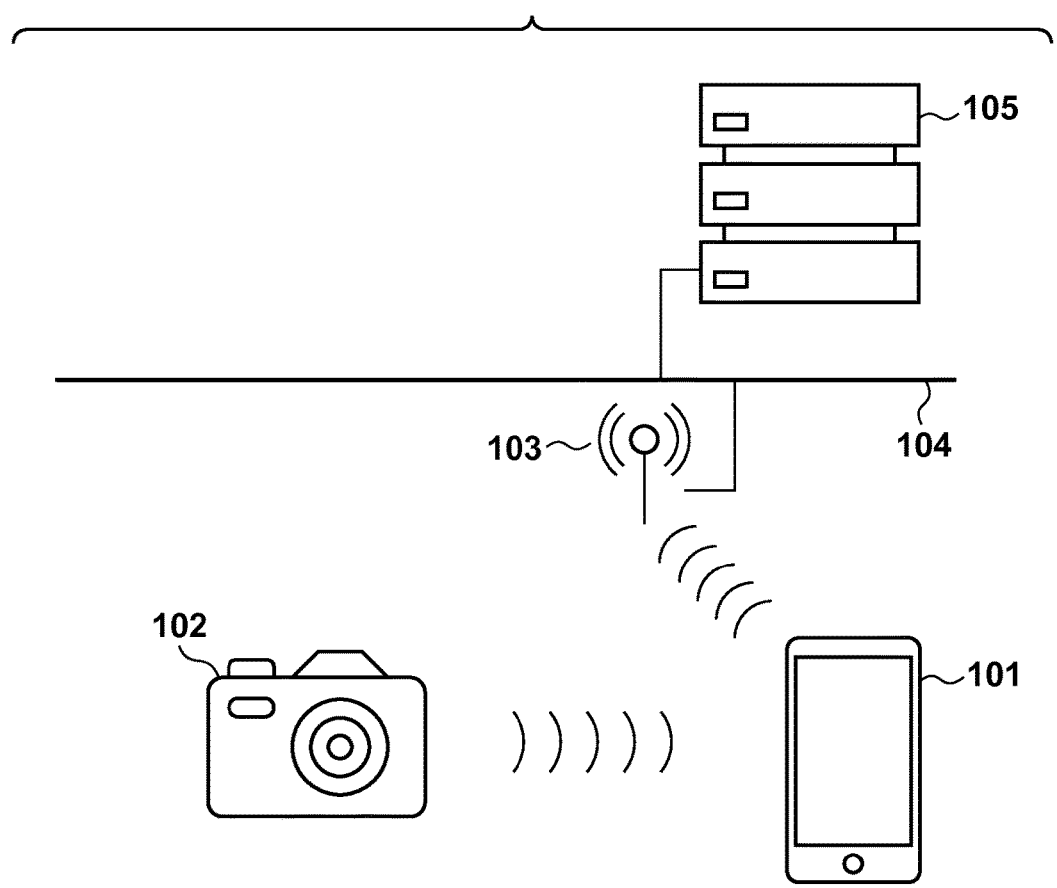
FIG. 1 is a diagram illustrating a system configuration according to a first embodiment.

First, a system configuration of the present embodiment will be described with reference to FIG. 1.

An information processing apparatus 101 has a function of connecting to the Internet 104 and an electronic apparatus 102 via a wireless LAN. Furthermore, the information processing apparatus 101 can participate in a wireless LAN network formed by the electronic apparatus 102 so as to perform data communication to and from the electronic apparatus 102. Furthermore, the information processing apparatus 101 are connectable to a wide area network (WAN) base station 103 using a communication scheme that corresponds to 3G, LTE, or the like, and can download an update program for application software or the like from a service provider server 105 via the Internet 104 connected to the WAN base station 103. The information processing apparatus 101 are connectable to only one network at a time, and cannot connect to the Internet 104 via the WAN base station 103 while being connected to the electronic apparatus 102 via the wireless LAN network formed by the electronic apparatus 102. The information processing apparatus 101 also has a reader/writer function for a close proximity wireless communication such as Near Field Communication, and can read out data from and write data in an NFC tag incorporated into the electronic apparatus 102.

Configuration of Electronic Apparatus

The configuration and functions of the digital camera 200 as the electronic apparatus 102 configuring the system of this embodiment will be described with reference to FIG. 2.

Figure 2:
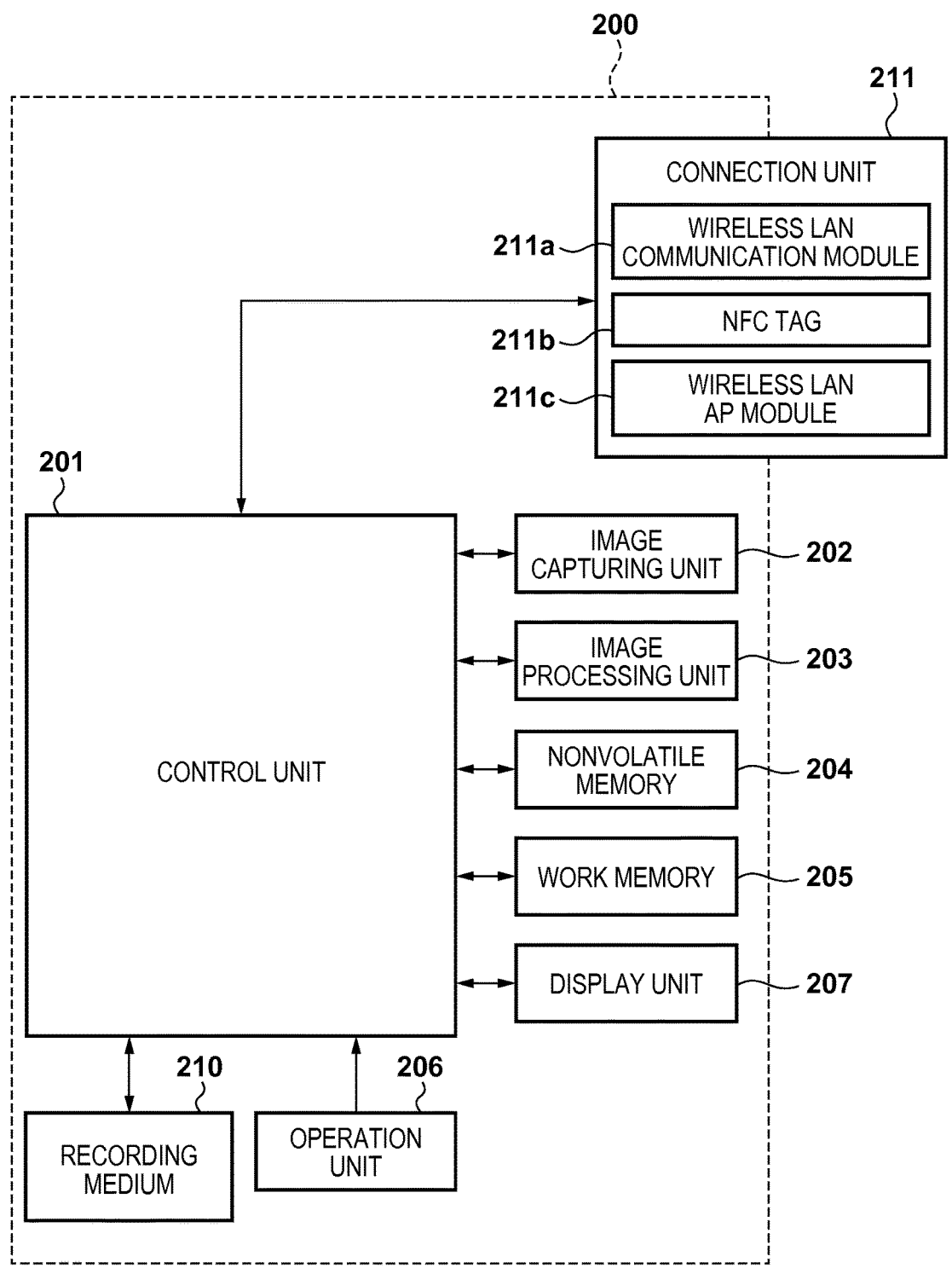
FIG. 2 is a block diagram illustrating a configuration of an electronic apparatus of the present embodiment.

Referring to FIG. 2, a control unit 201 is an arithmetic processing unit (CPU) which comprehensively controls the overall digital camera 200, and implements various types of processes in flowcharts (to be described later) by executing programs stored in a nonvolatile memory 204 (to be described later). Note that a plurality of pieces of hardware may control the overall apparatus by sharing processes instead of making the control unit 201 control the overall apparatus.

An image capturing unit 202 includes a lens group including a zoom lens and a focus lens and a shutter having a stop function. The image capturing unit 202 also includes an image sensor formed from a CCD, CMOS device, or the like which converts an object image into an electrical signal, and an A/D converter which converts the analog image signal output from the image sensor into a digital signal.

An image processing unit 203 performs image quality adjustment processing of adjusting white balance, color, brightness, and the like with respect to the image data captured by the image capturing unit 202, and also performs, for example, resize processing to a display size. The image processing unit 203 also generates an image file by compressing and coding the image data having undergone image quality adjustment processing by JPEG or the like, and records the file in a recording medium 210. The image processing unit 203 also performs predetermined arithmetic processing by using captured image data. The control unit 201 then controls the focus lens, stop, and shutter of the image capturing unit 202 based on the obtained arithmetic result, thereby performing AF (Automatic Focus) processing and AE (Automatic Exposure) processing.

The nonvolatile memory 204 is an electrically erasable/recordable memory, and, for example, an EEPROM is used. Constants, programs, and the like for the operation of the control unit 201 are recorded in the nonvolatile memory 204. In this case, the programs are those for executing various types of flowcharts to be described later in this embodiment.

A work memory 205 is used as a work area where constants and variables for the operation of the control unit 201, programs read out from the nonvolatile memory 204, and the like are loaded. The work memory 205 is also used as a buffer memory for temporarily holding the image data captured by the image capturing unit 202 or an image display memory for a display unit 207.

An operation unit 206 is constituted by operation members such as various types of switches and buttons and a touch panel which receive various types of operations from the user, including, for example, a power switch, a shutter release switch, and a mode change-over switch. The shutter release switch is turned on to generate a first shutter switch signal SW1 when the shutter button provided on the digital camera 200 is operated halfway, that is, half-pressed (shooting preparation instruction). Upon receiving the first shutter switch signal SW1, the control unit 201 controls the image capturing unit 202 to start an operation such as AF (Automatic Focus) processing, AE (Automatic Exposure) processing, AWB (Automatic White Balance) processing, or EF (Electronic Flash) processing. In addition, the shutter release switch is turned on to generate a second shutter switch signal SW2 when the shutter button is operated completely, that is, full-pressed (shooting instruction). Upon receiving the second shutter switch signal SW2, the control unit 201 starts a series of shooting operations from reading out a signal from the image capturing unit 202 to writing image data in the recording medium 210.

The display unit 207 displays a viewfinder image at the time of shooting, a captured image, and characters for a dialogical operation. The display unit 207 is, for example, a display device such as a liquid crystal display or organic EL display. The display unit 207 may be integrally formed with the digital camera 200 or an external apparatus connected to the digital camera 200.

The image processing unit 203 records a coded image file in the recording medium 210. The control unit 201 reads out an already recorded image file from the recording medium 210. The recording medium 210 may be a memory card, hard disk drive, or the like mounted in the digital camera 200, or a flash memory or hard disk drive built in the digital camera 200.

A connection unit 211 is an interface for connection to an external apparatus such as an information processing apparatus 101. The digital camera 200 according to this embodiment can exchange data with an external apparatus via the connection unit 211. Note that in this embodiment, the connection unit 211 includes a wireless LAN communication module 211a for wireless communication with an external apparatus. The control unit 201 implements wireless communication with an external apparatus by controlling the connection unit 211. Note that a communication scheme to be used is not limited to a wireless LAN. For example, USB (Universal Serial Bus) or Bluetooth® can be used. The connection unit 211 also includes a NFC tag 211b for a close proximity wireless communication. An external apparatus having a reader/writer function reads out data from the NFC tag 211b and writes data in the NFC tag 211b. The electronic apparatus 102 makes a connection request to an external apparatus by the NFC tag 211b, and transmits image data and the like via a wireless LAN and the like. The NFC tag 211b is called dynamic type, and transmission data is dynamically changeable by a control of the electronic apparatus 102.

Furthermore, in the present embodiment, the connection unit 211 also includes a wireless LAN access point module (hereinafter, referred to as wireless LAN AP module) 211c, which can operate as an access point (AP) that forms the wireless LAN network. When the digital camera 200 operates as a wireless LAN access point, the digital camera 200 itself forms the network. The information processing apparatus 101 that is present in the vicinity of the digital camera 200 can recognize the digital camera 200 as a wireless LAN access point, and can participate in the wireless LAN network of the digital camera 200. Note that in the present embodiment, the control unit 201 controls enabling/disabling of the wireless LAN access point based on capability information (Capability) indicating the capability of software that is needed for the information processing apparatus 101 to communicate with the electronic apparatus 102, as will be described later. As described above, assume that programs for operating the digital camera 200 are held in the nonvolatile memory 204.

Although the digital camera 200 in this embodiment is a kind of AP, it is a simple AP having no gateway function of transferring the data received from a slave apparatus to an Internet provider or the like. Even if, therefore, the digital camera 200 receives data from another apparatus participating in the network formed by itself, it cannot transfer the data to a network such as the Internet.

Configuration of Information Processing Apparatus

Figure 3:
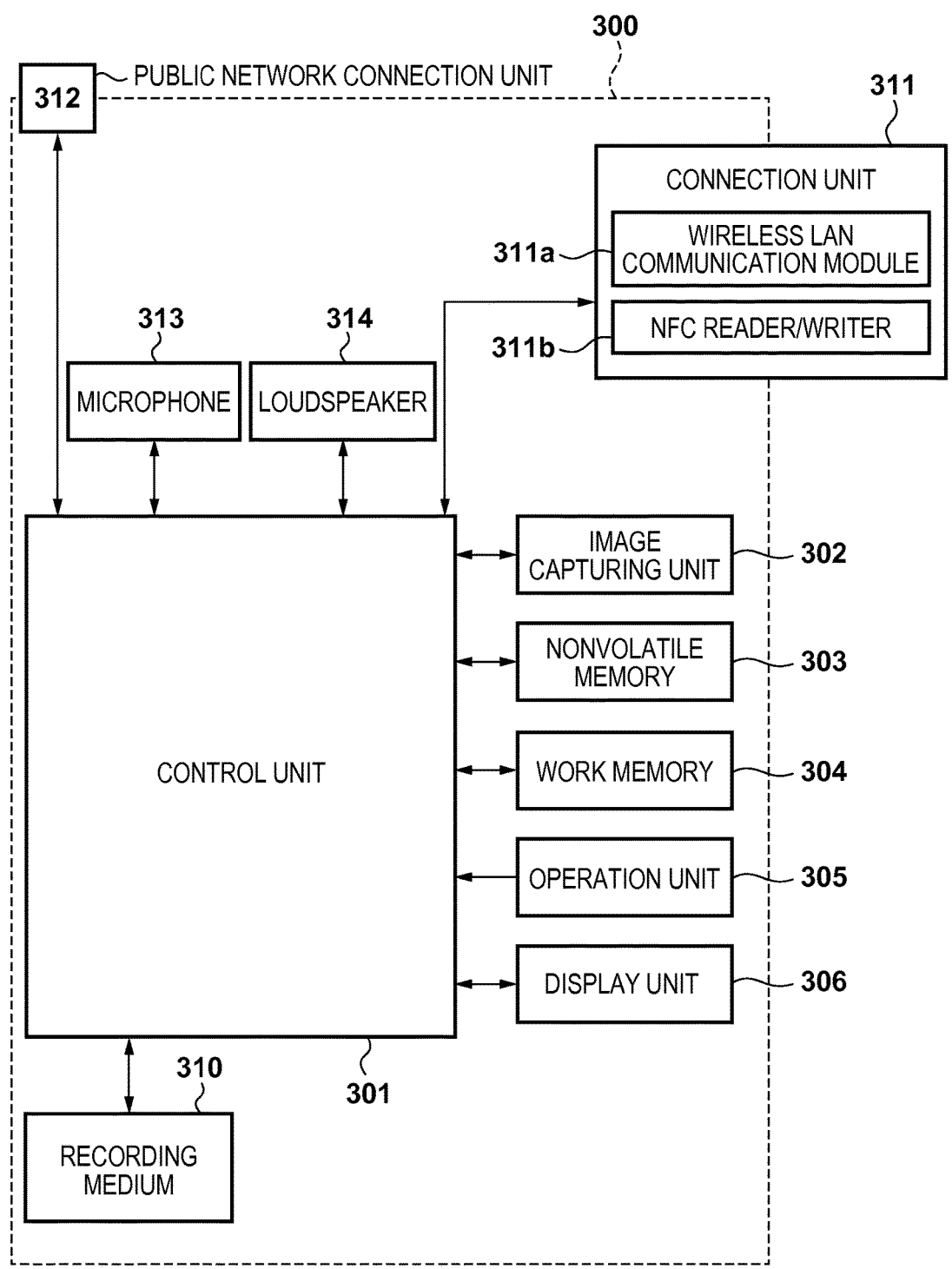
FIG. 3 is a block diagram illustrating a configuration of an information processing apparatus of the present embodiment.

The configuration and functions of the smartphone 300 as the information processing apparatus 101 configuring the system of this embodiment will be described with reference to FIG. 3.

The smartphone 300 according to this embodiment includes a control unit 301, an image capturing unit 302, a nonvolatile memory 303, a work memory 304, an operation unit 305, a display unit 306, a recording medium 310, and a connection unit 311. The basic functions of the respective elements are the same as those of the digital camera 200, and hence a detailed description of them will be omitted. If the information processing apparatus 101 is a PC, it need not include any display unit as long as it includes a display control function which controls the display of the display unit.

Assume that application software for communication with the digital camera 200 is held in the nonvolatile memory 303. Note that processing in the smartphone 300 according to this embodiment is implemented by reading software provided by an application. Assume that an application has software for the use of the basic function of the OS installed in the smartphone 300. Note that the OS of the smartphone 300 may have software for implementing processing in this embodiment.

The connection unit 311 includes a wireless LAN communication module 311a for wireless communication with an external apparatus. The control unit 301 implements wireless communication with an external apparatus by controlling the connection unit 311. Note that a communication scheme to be used is not limited to a wireless LAN. For example, USB (Universal Serial Bus) or Bluetooth® can be used. The connection unit 311 also includes a NFC reader/writer 311b for a close proximity wireless communication.

A public network connection unit 312 is an interface used for wireless communication via Wide Area Network (WAN) such as 3G or LTE. The smartphone 300 can perform telephone call and data communication with another device via the public network connection unit 312. When performing telephone call, the control unit 301 inputs and outputs voice signals via a microphone 313 and a loudspeaker 314. Assume that in this embodiment, the public network connection unit 312 is not limited to 3G or LTE and it is possible to use another communication scheme such as WiMAX, ADSL or FTTH. In addition, the connection unit 311 and the public network connection unit 312 need not be implemented by independent pieces of hardware. For example, one antenna can have both the functions.

Communication Processing of Digital Camera 200

Hereinafter, processing of the digital camera 200 until it establishes a connection to the smartphone 300 of the present embodiment will be described with reference to FIG. 4.

Figure 4:
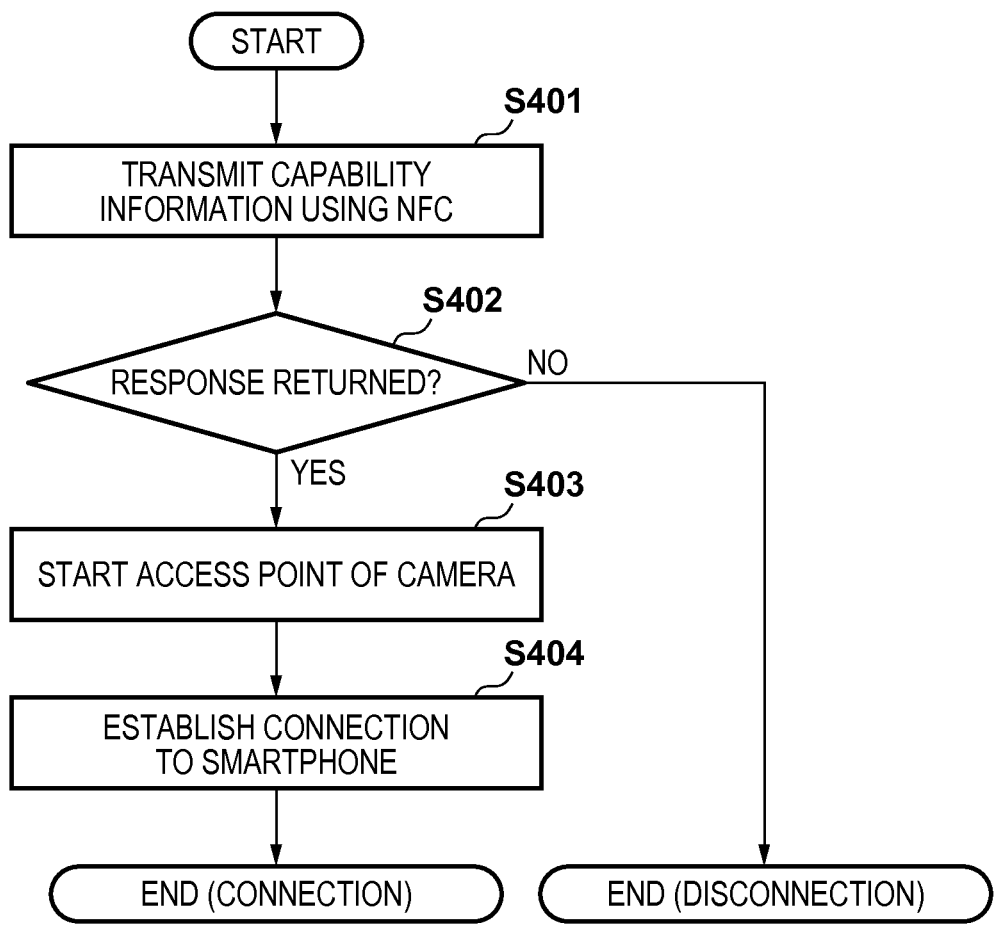
FIG. 4 is a flowchart illustrating the processing until the electronic apparatus establishes a connection to the information processing apparatus according to the present embodiment.

Note that the processing shown in FIG. 4 is realized by the control unit 201 reading out the programs stored in the nonvolatile memory 204 onto the work memory 205 and executing them.

In step S401, the control unit 201 transmits, to the smartphone 300, capability information indicating the capability of software that is needed for the smartphone 300 to perform the wireless LAN communication with the digital camera 200 based on the data of the NFC tag 211b.

In step S402, the control unit 201 stands by until a response is returned from the smartphone 300 within a predetermined time period based on the data of the NFC tag 211b. If no response is returned from the smartphone 300 within the predetermined time period, the connection with NFC is disconnected and the procedure ends. Whereas, if a response is returned from the smartphone 300 within the predetermined time period, the procedure advances to step S403.

In step S403, the control unit 201 starts the wireless LAN AP module 211c to form a network, and the smartphone 300 can participate in the same network as that of the digital camera 200.

Then, in step S404, the control unit 201 performs device discovery, and establishes a connection to the smartphone 300 that is participating in the network of the digital camera 200.

Communication Processing of Smartphone 300

Hereinafter, processing of the smartphone 300 until it establishes a connection to the digital camera 200 according to the present embodiment will be described with reference to FIG. 5.

Figure 5:
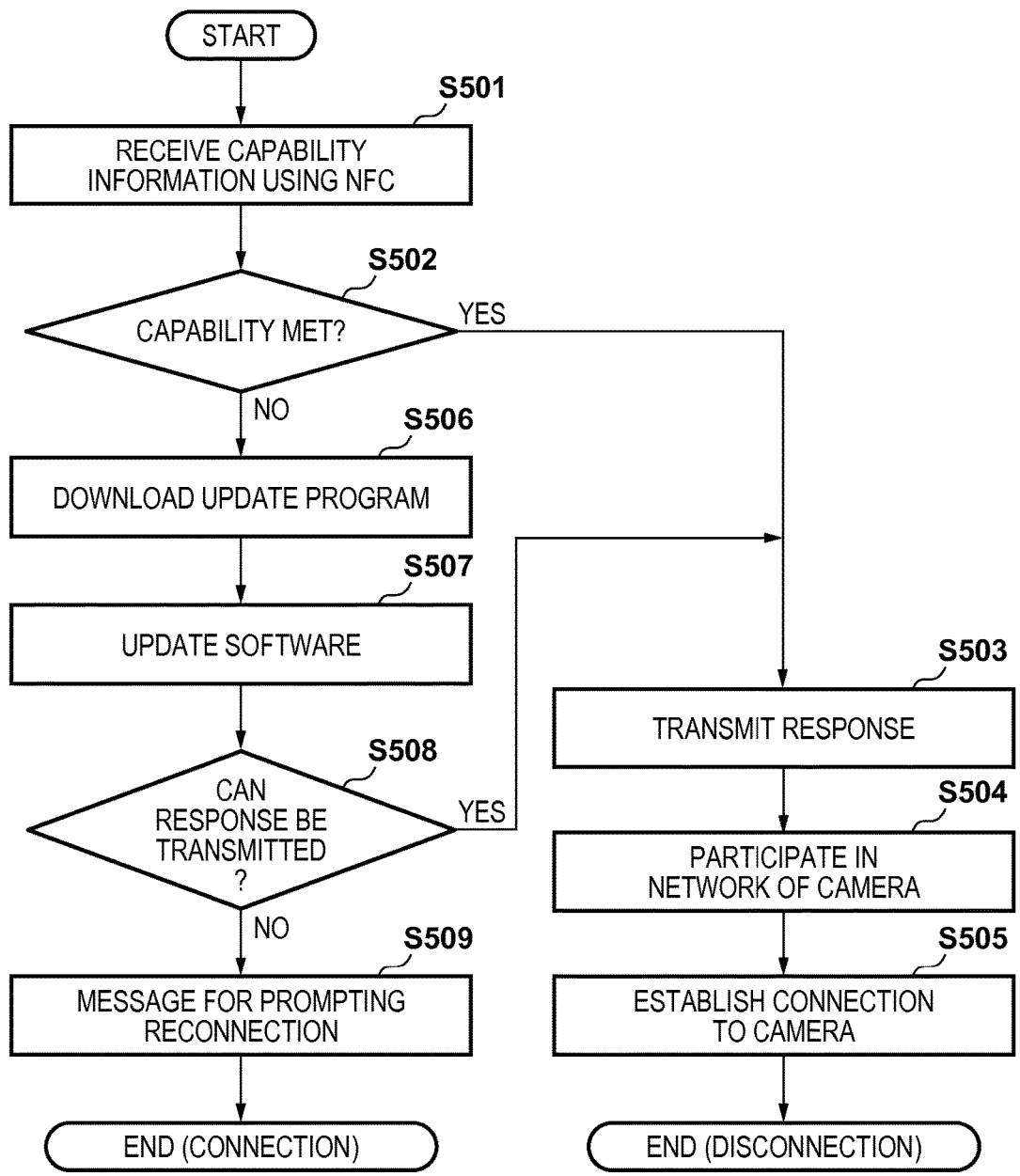
FIG. 5 is a flowchart illustrating the processing until the information processing apparatus establishes a connection to the electronic apparatus according to the present embodiment.

Note that the processing shown in FIG. 5 is realized by the control unit 301 reading out programs stored in the nonvolatile memory 303 onto the work memory 304 and executing them.

In step S501, the control unit 301 receives the capability information indicating the capability of software that is needed for communication with the digital camera 200 using the wireless LAN network, by the NFC reader/writer 311b reading out the NFC tag 211b of the digital camera 200.

In step S502, the control unit 301 compares the capability information of the software with the capability information acquired from the digital camera 200 so as to determine whether or not the software meets the capability described in the capability information, and if the software meets the capability, the procedure advances to step S503, whereas if the software does not meet the capability, the procedure advances to step S506.

In step S503, the control unit 301 transmits a response to the digital camera 200.

In step S504, the control unit 301 participates in the network of the digital camera 200.

In step S505, the control unit 301 establishes a connection to the digital camera 200.

Specifically, since a response is transmitted to the digital camera 200 in step S503, the digital camera 200 starts the wireless LAN AP module 211c in the processing of step S403 of FIG. 4 to form the wireless LAN network. Furthermore, the smartphone 300 participates in the wireless LAN network formed by the digital camera 200. Since the digital camera 200 and the smartphone 300 are participating in the same network, the connection between the digital camera 200 and the smartphone 300 can be established in step S505. In this case, the smartphone 300 is not connected to the Internet 104.

If, in step S502, the software of the smartphone 300 does not meet the capability of the software that is needed for connecting to the digital camera 200, the control unit 301 does not transmit a response to the digital camera 200, and the procedure advances to step S506.

In step S506, the control unit 301 accesses the service provider server 105 via the Internet 104, and downloads update software. In this case, since no response was transmitted to the digital camera 200, the digital camera 200 is standing by awaiting a response from the smartphone 300 in step S402 of FIG. 4, and the wireless LAN AP module 211c has not been started. Therefore, the smartphone 300 will participate in the wide area network via the WAN base station 103, and can establish the connection to the service provider server 105 on the Internet 104.

In step S507, the control unit 301 updates the existing software to the software downloaded in step S506. It is then necessary to transmit a response to the digital camera 200, but a situation may arise in which no response can be transmitted to the digital camera 200 due to, for example, an increase in the physical distance to the digital camera 200 during the update of the software. Therefore, in step S508, the control unit 301 determines whether or not the smartphone 300 is in the situation in which it can transmit a response to the digital camera 200. As a result of the determination, if the smartphone 300 is in the situation in which it can transmit a response, the procedure advances to step S503, where the smartphone 300 transmits a response to the digital camera 200, whereas if the smartphone 300 is in the situation in which it cannot transmit a response, the procedure advances to step S509, where a message for prompting the user to retry to connect to the digital camera 200 is displayed on the display unit 306. Here, if the user retries to connect to the digital camera 200 in accordance with the message, the digital camera 200 will execute the processing of FIG. 4 from the beginning, and the smartphone 300 will execute the processing of FIG. 5 from the beginning. As a result, a response is immediately transmitted to the digital camera 200 since the software running on the smartphone 300 has already met the needed capability, and the connection can be established.

Accordingly, when switching the wide area network connection to the local network connection of the digital camera 200, the smartphone 300 of the present embodiment updates the existing software to the software needed for communication and then establishes a connection to the digital camera 200. Accordingly, it is possible to prevent a situation in which when the software of the smartphone 300 needs to be updated, the smartphone 300 cannot access a server on the Internet that provides update software and the software cannot be updated.

Information Communicated by NFC

Figure 6A:
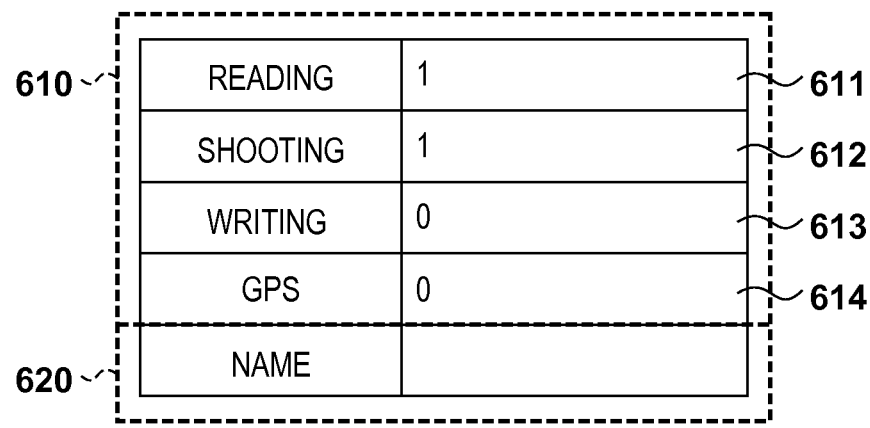
FIGS. 6A and 6B are diagrams illustrating examples of capability information that is transmitted and received between the information processing apparatus and the electronic apparatus in the processing of FIGS. 4 and 5.
Figure 6B:
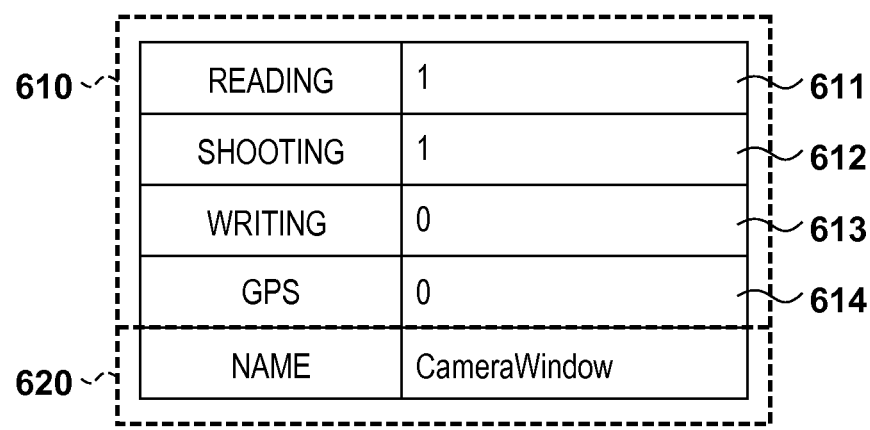

The following will describe information that is transmitted and received by NFC in FIGS. 4 and 5 with reference to FIGS. 6A and 6B.

FIG. 6A shows information that is written into the NFC tag 211b by the digital camera 200 in step S501 of FIG. 5. Two types of information, namely, a capability information area 610 and a connected software name area 620 can be recorded in the NFC tag 211b. At the time of step S501, the digital camera 200 records information in the capability information area 610, and records blank data in the connected software name area 620.

FIG. 6B shows information that is written into the NFC tag 211b by the smartphone 300 in step S503. The name of software is written into the connected software name area 620 in which the blank data is recorded in FIG. 6A.

That is, the software running on the smartphone 300 transmitting a response to establish a connection to the digital camera 200 in step S503 refers to the digital camera 200 writing the name of the software into the connected software name area 620 of the NFC tag 211b. Furthermore, the digital camera 200 standing by awaiting a response from the smartphone 300 in step S502 refers to waiting until the connected software name area 620 of the NFC tag 211b is no longer blank, that is, data being written by the NFC reader/writer 311b of the smartphone 300.

An example of the capability information area 610 recorded in FIG. 6A will be described. The capability information area 610 includes an image reading function flag 611, an image remote-shooting function flag 612, an image writing function flag 613, and a GPS information access function flag 614. The digital camera 200 of the present embodiment needs the image reading function and the remote image-shooting function for the software, and thus "1" is set for the image reading function flag 611 and the image remote-shooting function flag 612. Furthermore, "0" is set for the image writing function flag 613 and the GPS information access function flag 614. The software running on the smartphone 300 compares, in step S502, the flags described in the capability information area 610 with the capability of the software itself. If, as a result of the comparison, the software of the smartphone 300 does not have the remote image-shooting function for example, the control unit 301 downloads, in step S506, update software for adding the remote image-shooting function to the existing software from the service provider server 105.

Note that in the present embodiment, an example is illustrated in which as capability information needed for the software, the necessity of functions for the software is described in units of functions, but instead, a configuration is also possible in which, for example, only information on the needed version of software is described. In this case, the software running on the smartphone 300 compares, in step S502, its own version information with the version information described in the capability information area 610, and if the version is not sufficient, software of the version needed for establishing a connection to the digital camera 200 will be downloaded from the service provider server 105 in step S506.

FIG. 7 show examples of messages that are displayed on the UI screen of the smartphone 300 in the processing of FIG. 5.

Figures 7A, 7B:
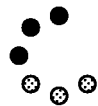
FIGS. 7A and 7B are diagrams illustrating examples of messages that are displayed on the information processing apparatus in the processing of FIG. 5.

FIG. 7A shows the message that is displayed during the update of the software in step S507. If the digital camera 200 is physically separated from the smartphone 300 during the update of the software, it will not be possible to transmit a response to the digital camera 200 in step S508 after the completion of the update, and the user will need to perform again a connection operation. In order to prevent such a situation, a message for prompting the user to keep the smartphone 300 in contact with the camera 200 during the update of the software is displayed.

FIG. 7B shows the message that is displayed in step S509 when no response could be transmitted to the digital camera 200 because, for example, the user separated the smartphone 300 from the digital camera 200 during the update of the software. This message has the content for prompting the user of the smartphone 300 to retry to establish a connection between the smartphone 300 and the digital camera 200.

Second Embodiment

Hereinafter, a system according to a second embodiment will be described with reference to FIGS. 8 to 11.

System Configuration

Figure 8:
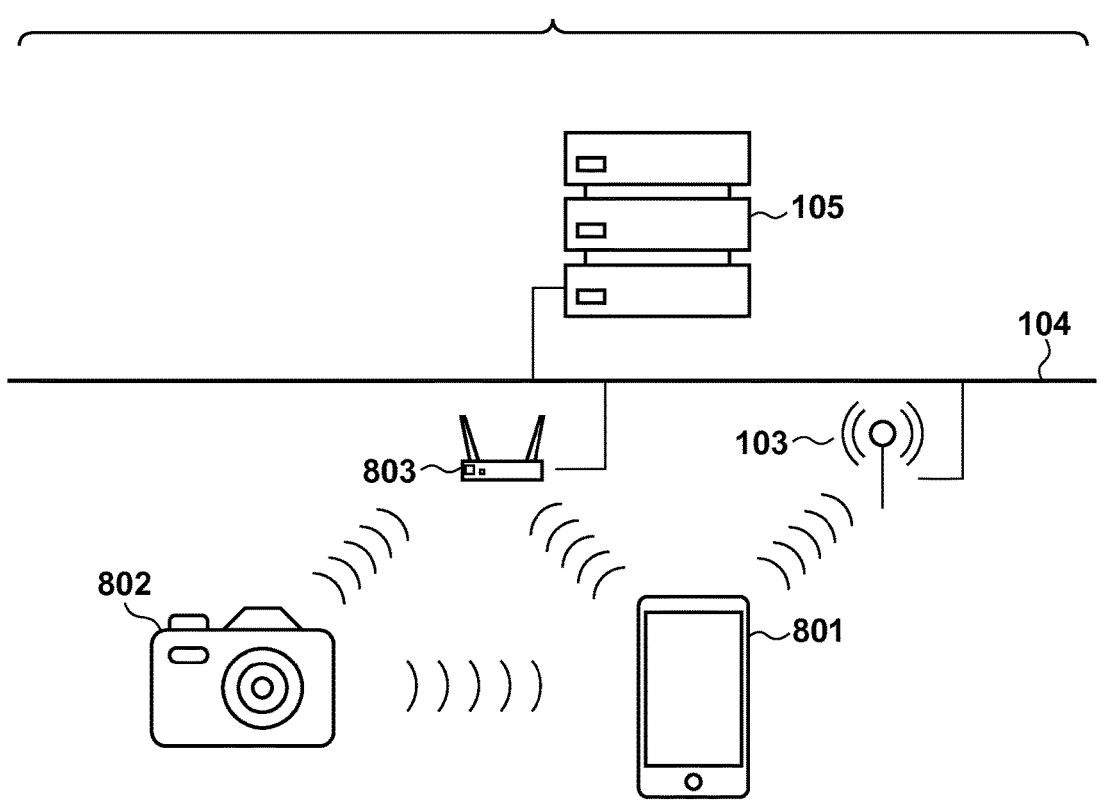
FIG. 8 is a diagram illustrating a system configuration according to a second embodiment.

First, a system configuration of the second embodiment will be described with reference to FIG. 8.

An information processing apparatus 801 and an electronic apparatus 802 according to the present embodiment are connectable to a wireless LAN access point 803 that is fixed to and installed on a predetermined place. In this case, the information processing apparatus 801 accesses the service provider server 105 via the Internet 104 by connecting to the wireless LAN access point 803, instead of the WAN base station 103. Furthermore, the electronic apparatus 802 connects to the information processing apparatus 801 via the wireless LAN access point 803 so as to be able to communicate data with the information processing apparatus 801.

Furthermore, the electronic apparatus 802 is connectable to the information processing apparatus 801 using the wireless LAN communication module 211a. In other words, in an environment in which the wireless LAN access point 803 is available, the electronic apparatus 802 can use the wireless LAN communication module 211a to establish a connection to the information processing apparatus 801 via the wireless LAN access point 803. Note that even in an environment in which the wireless LAN access point 803 is not available, the electronic apparatus 802 can establish a connection to the information processing apparatus 801 by enabling the wireless LAN AP module 211c. In this case, the information processing apparatus 801 is connected only to the wireless LAN network of the electronic apparatus 802, and thus cannot connect to the WAN base station 103.

Furthermore, the configurations and functions of the information processing apparatus 801 and the electronic apparatus 802 of the present embodiment are the same as those of the configurations described with reference to FIGS. 1 to 3.

FIG. 9 shows examples of UI screens that are displayed on the information processing apparatus 801 and the electronic apparatus 802 when they participate in the same wireless LAN network.

Figure 9A:
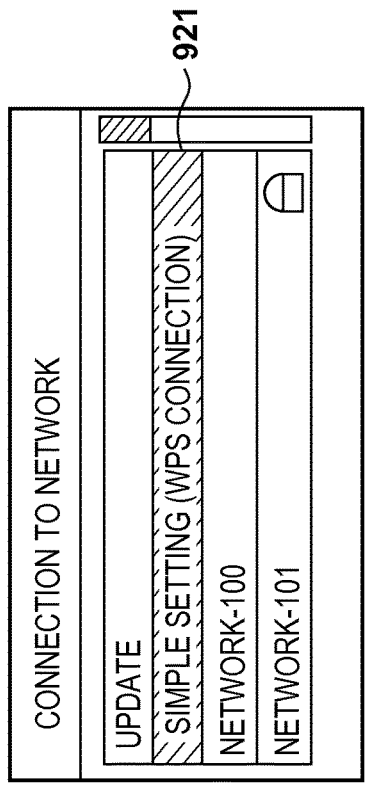
FIGS. 9A to 9D are diagrams illustrating examples of UI screens that are displayed on an information processing apparatus and an electronic apparatus of the second embodiment.

FIG. 9A shows the screen that is displayed on the display unit 207 when the electronic apparatus 802 is started in a mode for connecting to the information processing apparatus 801. In this screen, the user can select whether the communication with the information processing apparatus 801 is performed via the wireless LAN access point 803 using the wireless LAN communication module 211a, or is performed by enabling the wireless LAN AP module 211c. If an item 901 "use camera as access point" is selected, the setting to enable the wireless LAN AP module 211c of the electronic apparatus 802 will be possible. Whereas, if an item 902 "search for access point" is selected, it will be possible to search for a wireless LAN access point 803 that is available at that time, and to connect thereto.

Figure 9B:

If the item 901 "use camera as access point" is selected, the screen will shift to the screen of FIG. 9B. In this screen, setting values such as an ID and an encryption key that are needed for the information processing apparatus 801 to participate in a wireless LAN network formed by the wireless LAN AP module 211c are displayed in a setting value display region 911 of the screen of the electronic apparatus 802.

Figure 9C:
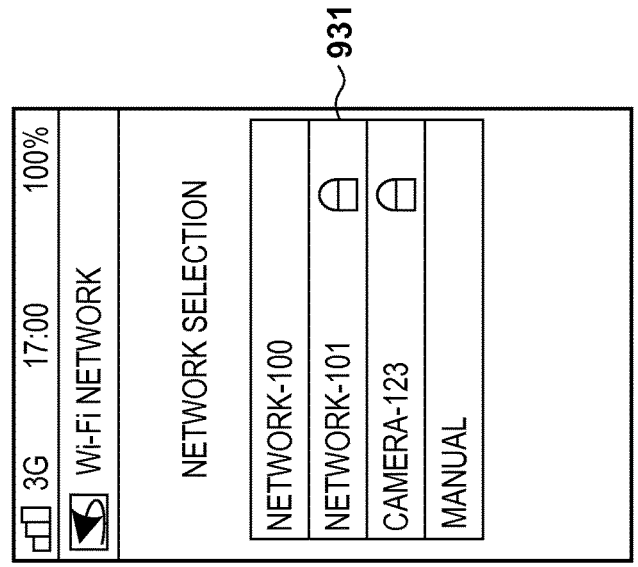

If the item 902 "search for access point" is selected, the screen will shift to the screen of FIG. 9C. This screen shows a wireless LAN network list 921 that includes networks available in the environment in which the electronic apparatus 802 is used. The user can select, from this list, the network used by the information processing apparatus 801, which is the connection counterpart, and can participate in the selected network. At the place in which the wireless LAN access point 803 is available, the wireless LAN network list 921 shows the name of the wireless LAN access point 803, and thus the user only needs to select this wireless LAN access point 803.

Figure 9D:
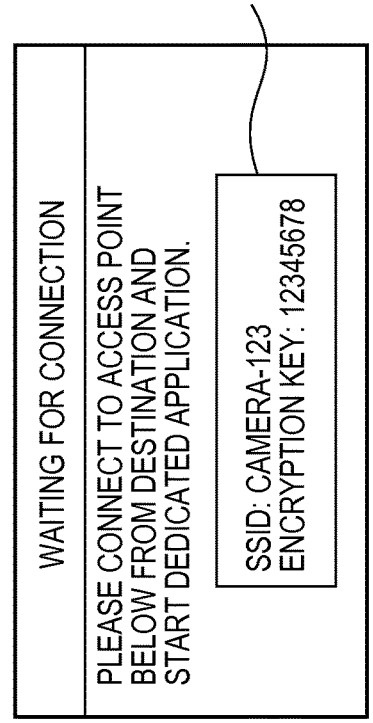

FIG. 9D shows the screen of the information processing apparatus 801 on which network connection settings are configured. Since the wireless LAN network list 931 is a list of networks available at that time, the user of the information processing apparatus 801 can select a suitable network and participate in the selected network. Furthermore, the user of the information processing apparatus 801 inputs the same setting value as that of the network selected by the electronic apparatus 802 in order to participate in the same network as that of the electronic apparatus 802. For example, if the item 901 is selected on the screen of the electronic apparatus 802 of FIG. 9A, the user only needs to input and set the setting value displayed in the setting value display region 911 of the screen of the electronic apparatus 802 of FIG. 9B in the screen of the information processing apparatus 801 of FIG. 9D. If the item 902 of the screen of the electronic apparatus 802 of FIG. 9A is selected, and the network of the wireless LAN access point 803 on the screen of FIG. 9C is selected, the user only needs to select the same network of the wireless LAN access point 803 on the screen of the information processing apparatus 801 of FIG. 9D.

Accordingly, in the state in which the information processing apparatus 801 and the electronic apparatus 802 are participating in the same network, the software of the information processing apparatus 801 is started, and thereby a connection to the electronic apparatus 802 will be established.

The following description will be given assuming that the information processing apparatus 801 of the present embodiment is referred to as the smartphone 300, and the electronic apparatus 802 of the present embodiment is referred to as the digital camera 200.

Communication Processing of Digital Camera 200

Figure 10:
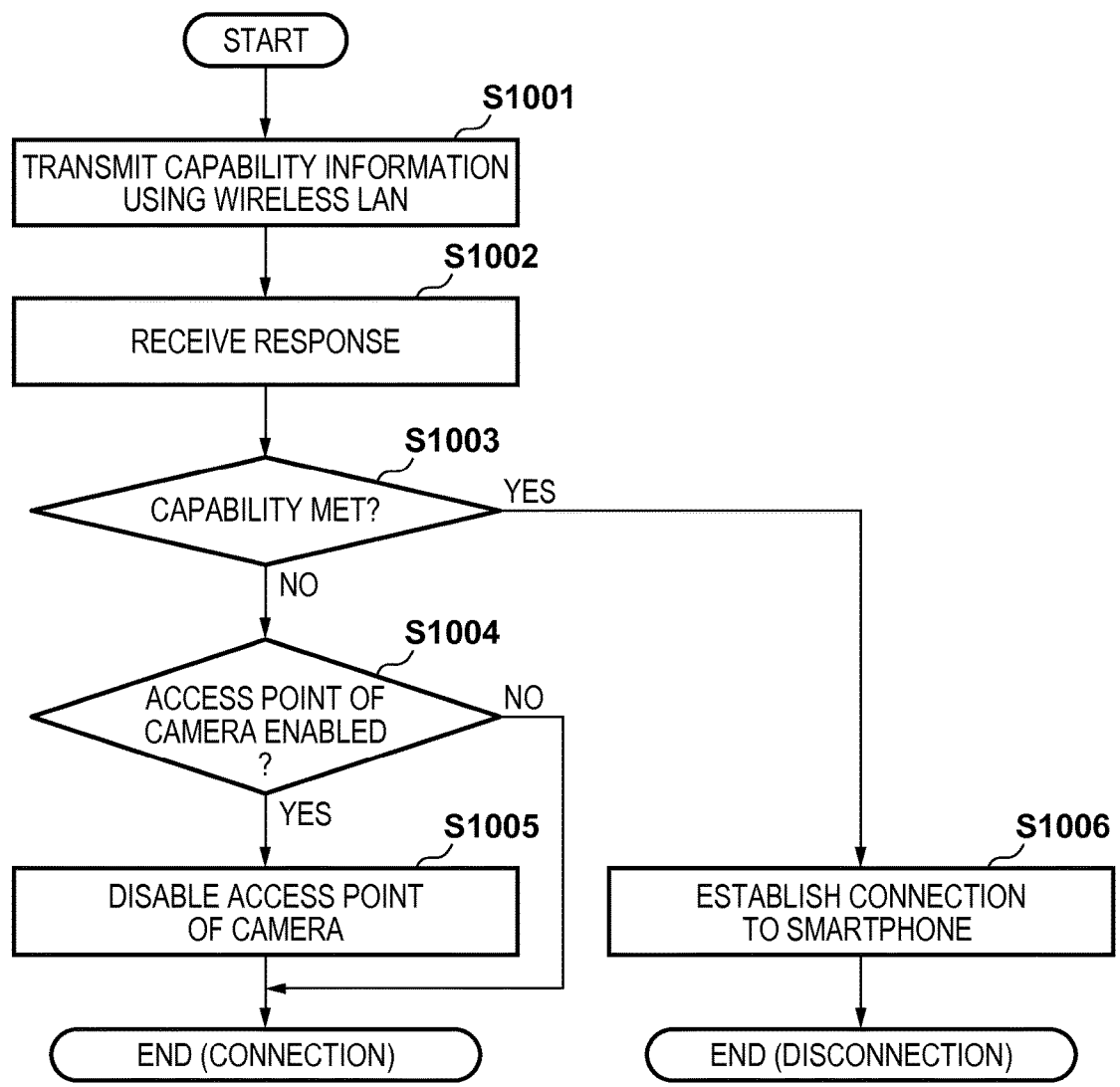
FIG. 10 is a flowchart illustrating the processing until an electronic apparatus establishes a connection to the information processing apparatus according to the second embodiment.

Hereinafter, processing of the digital camera 200 until it establishes a connection to the smartphone 300 according to the present embodiment will be described with reference to FIG. 10. Note that the processing of FIG. 10 is realized by the control unit 201 reading out programs stored in the nonvolatile memory 204 onto the work memory 205 and executing them. Furthermore, the processing of FIG. 10 is executed in accordance with the network connection setting of FIG. 9 in the state in which the digital camera 200 and the smartphone 300 are participating in the same network.

In step S1001, the control unit 201 transmits capability information of software that is needed for the smartphone 300 to communicate with the digital camera 200 using a wireless LAN to the smartphone 300 via the wireless LAN access point connected according to the procedure of FIG. 9.

In step S1002, the control unit 201 receives a response from the smartphone 300.

In step S1003, the control unit 201 determines whether or not the software meets the capability described in the capability information based on the content of the response from the smartphone 300, and if the software meets the capability, the procedure advances to step S1006, whereas if the software does not meet the capability, the procedure advances to step S1004.

In step S1004, the control unit 201 determines whether or not the wireless LAN AP module 211c has been enabled, and if the wireless LAN AP module 211c has been enabled, the procedure advances to step S1005, whereas if the wireless LAN AP module 211c has been disabled, the procedure ends.

In step S1005, the control unit 201 disables the wireless LAN AP module 211c, and the procedure ends. If the wireless LAN AP module 211c is disabled, the smartphone 300 that was set to participate in this network by the connection setting on the screen of FIG. 9D is automatically disconnected from the wireless LAN network of the digital camera 200. As a result, the smartphone 300 is connected to the Internet 104 via the WAN base station 103, so as to be able to download update software from the service provider server 105.

In step S1004, if the wireless LAN AP module 211c has been disabled, the smartphone 300 is participating in the network of the wireless LAN access point 803, and thus can download the update software from the service provider server 105 on the Internet 104.

In step S1006, the control unit 201 establishes a connection to the smartphone 300 because the software meets the capability for communicating with the digital camera 200 based on the response from the smartphone 300.

In the present embodiment, the same type of information as that of the information of FIG. 6A is used as the capability information that is transmitted to the smartphone 300 in step S1001. Furthermore, similarly, the same type of information as that of the information of FIG. 6B is used as capability information included in the response from the smartphone 300 in step S1002. If the software meets the capability described in the capability information transmitted from the digital camera 200, the smartphone 300 responds by recording the name of the software in the connected software name area 620. The determination in step S1003 is made based on whether or not the connected software name area 620 is blank.

Communication Processing of Smartphone 300

Hereinafter, processing of the smartphone 300 until it establishes a connection to the digital camera 200 according to the present embodiment will be described with reference to FIG. 11.

Figure 11:
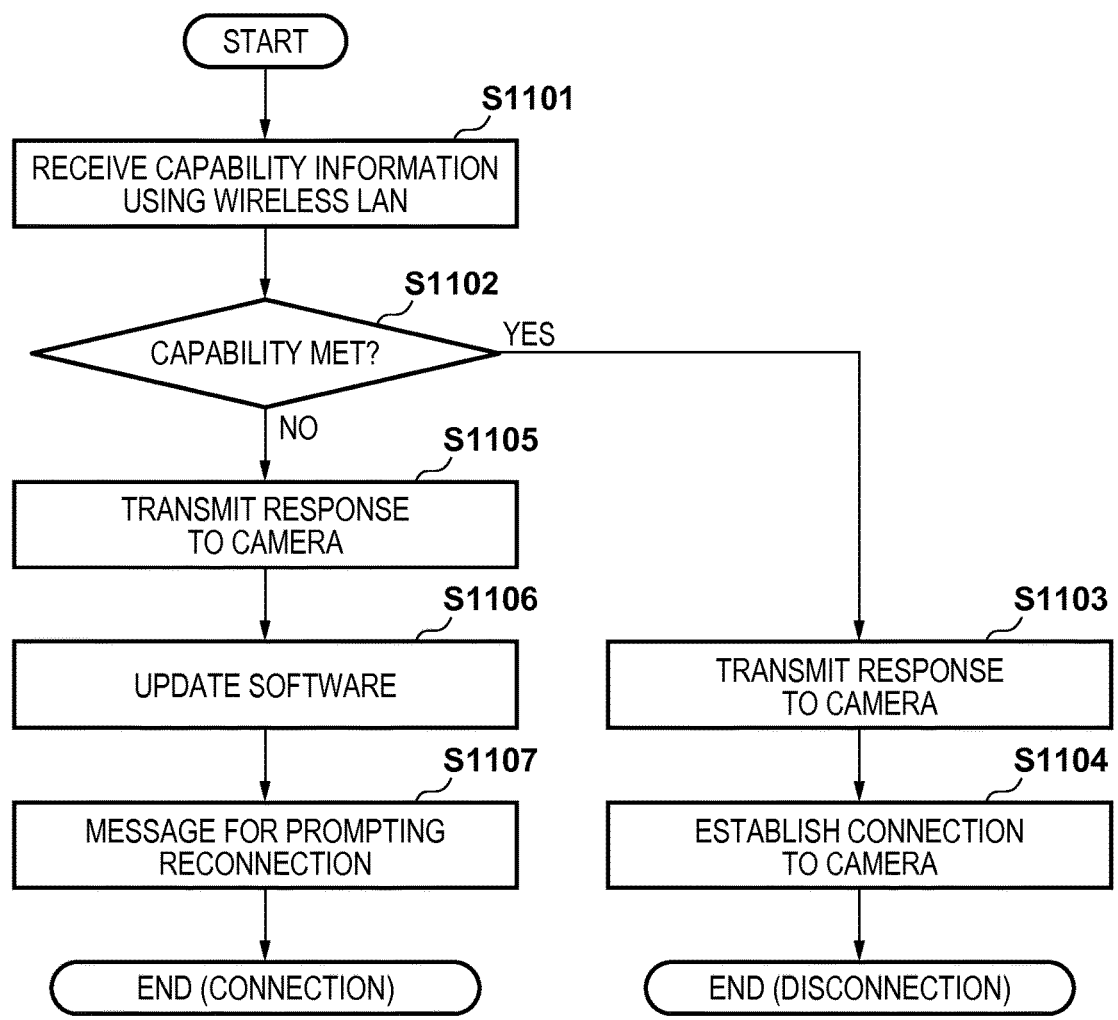
FIG. 11 is a flowchart illustrating the processing until the information processing apparatus establishes a connection to the electronic apparatus according to the second embodiment.

Note that the processing of FIG. 11 is realized by the control unit 301 reading out programs stored in the non-volatile memory 303 onto the work memory 304 and executing them. Furthermore, the processing of FIG. 11 is executed in the state in which the digital camera 200 and the smartphone 300 are participating in the same network in accordance with the network connection setting of FIG. 9.

In step S1101, the control unit 301 receives capability information indicating the capability of software that is needed for communication with the digital camera 200 using a wireless LAN from the digital camera 200 via the wireless LAN access point to which the smartphone 300 has connected according to the procedure of FIG. 9.

In step S1102, the control unit 301 determines whether or not the software meets the capability described in the capability information, and if the software meets the capability, the procedure advances to step S1103, whereas if the software does not meet the capability, the procedure advances to step S1105.

In step S1103, the control unit 301 transmits a response to the digital camera 200 by recording the name of the software in the connected software name area 620 as shown in FIG. 6B.

In step S1104, the control unit 301 establishes a connection to the digital camera 200.

In step S1105, the control unit 301 transmits a response to the digital camera 200 without recording the name of the software in the connected software name area 620 as in FIG. 6A. If, here, the smartphone 300 participates in the wireless LAN network of the digital camera 200 according to the network connection setting of FIG. 9, the wireless LAN access point of the digital camera 200 will be disabled in step S1005 of FIG. 10, and accordingly the smartphone 300 will automatically be connected to the Internet 104 via the WAN base station 103.

In step S1106, the control unit 301 downloads update software from the service provider server 105, and updates the existing software.

Thereafter, in step S1107, the control unit 301 displays, on the display unit 306, a message for prompting the user to retry to connect to the digital camera 200, and the processing ends. This message has the content that, for example, the software of the smartphone 300 has been updated, a connection to the digital camera 200 is possible, and the user is prompted to reconnect to the digital camera 200. If the user retries to connect to the digital camera 200 again in accordance with the message, the digital camera 200 will execute the processing of FIG. 10 from the beginning, and the smartphone 300 will execute the processing of FIG. 11 from the beginning. As a result, a response having the content that the software meets the capability is transmitted to the digital camera 200 in step S1103 since the software running on the smartphone 300 has already met the needed capability, and the connection can be established.

Accordingly, when switching the wide area network connection to a network connection shared with the digital camera 200, the smartphone 300 of the present embodiment updates the existing software to the software that is needed for communication and then establishes a connection to the digital camera 200. Accordingly, it is possible to prevent a situation in which when the software of the smartphone 300 needs to be updated, the smartphone 300 cannot access a server on the Internet that provides update software and the software cannot be updated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-240364, filed Nov. 27, 2014 which is hereby incorporated by reference herein in its entirety.

What is claimed is:

1. An information processing apparatus comprising: one or more communication interfaces having one or more circuits which function as a connection unit and a receiving unit; the connection unit configured to be connectable to an electronic apparatus using a first communication method or a second communication method, wherein the electronic apparatus is capable of operating as an access point which is connectable using the first communication method and has no gateway function to an Internet during connection using the first communication method; the receiving unit configured to receive, from the electronic apparatus using the second communication method, information indicating a capability of software that is needed for communication with the electronic apparatus using the first communication method; one or more processors executing computer instructions or circuits which function as each of the following: a determination unit configured to determine whether or not software of the information processing apparatus meets the capability; a transmitting unit configured, if it is determined by the determination unit that the software of the information processing apparatus meets the capability, to transmit a response for operating the electronic apparatus as the access point which is connectable using the first communication method, to the electronic apparatus; an acquiring unit configured, if it is determined by the determination unit that the software of the information processing apparatus does not meet the capability, to acquire software that meets the capability from a server on the Internet using a third communication method without transmitting the response to the electronic apparatus by the transmitting unit so as not to operate the electronic apparatus as the access point; and a control unit configured to enable and switch to the communication with the electronic apparatus using the first communication method after the software that meets the capability is acquired using the third communication method.

2. The apparatus according to claim 1, wherein the first communication method is a network formed by the electronic apparatus, the second communication method is close proximity wireless communication, and the third communication method is a wide area network.

3. The apparatus according to claim 2, wherein in a case where the communication with the electronic apparatus using the first communication method is performed, the control unit disconnects communication using the third communication method and switches to the communication using the first communication method.

4. The apparatus according to claim 1, further comprising: a display device configured to display, when the software that meets the capability is obtained and available, a message for prompting a user to perform the communication with the electronic apparatus using the first communication method.

5. The apparatus according to claim 1, wherein the information indicating a capability includes information on a version of the software.

6. An information processing apparatus comprising: one or more communication interfaces having one or more circuits which function as a connection unit and a receiving unit; the connection unit configured to be connectable to an electronic apparatus using a first communication method or a second communication method, wherein the electronic apparatus is capable of operating as an access point which is connectable using the first communication method and has no gateway function to an Internet during connection using the first communication method; the receiving unit configured to receive, from the electronic apparatus, information indicating a capability of software that is needed for communication with the electronic apparatus using the second communication method; one or more processors executing computer instructions or circuits which function as each of the following units: a determination unit configured to determine whether or not software of the information processing apparatus meets the capability; a transmitting unit configured, if it is determined by the determination unit that the software of the information processing apparatus meets the capability, to transmit a response for operating the electronic apparatus as the access point which is connectable using the first communication method, to the electronic apparatus; an acquiring unit configured, if it is determined by the determination unit that the software of the information processing apparatus does not meet the capability, to acquire software that meets the capability from a server on the Internet using the second communication method without transmitting the response to the electronic apparatus by the transmitting unit so as not to operate the electronic apparatus as the access point; and a control unit configured to enable and switch to the communication with the electronic apparatus using the first communication method after the software that meets the capability is fully acquired using a communication method other than the first communication method.

7. The apparatus according to claim 6, wherein the first communication method is a network formed by the electronic apparatus, and the second communication method is a network connected to a wide area network.

8. The apparatus according to claim 7, wherein in a case where the communication with the electronic apparatus using the first communication method is performed, the control unit disconnects communication using the second communication method and switches to the communication using the first communication method.

9. The apparatus according to claim 6, wherein one or more processors executing computer instructions or circuits also function as a connection setting unit configured to set a connection using the first communication method or a connection using the second communication method as a connection destination.

10. An electronic apparatus capable of operating as an access point, which is connectable using a first communication method and has no gateway function to an Internet during connection using the first communication method, comprising: one or more communication interfaces having one or more circuits which function as a first communication unit and a transmitting unit; the first communication unit configured to be connectable to an information processing apparatus; the transmitting unit configured to transmit, to the information processing apparatus via a second communication method, information indicating a capability of software that is needed for communication with the electronic apparatus using the first communication unit; and one or more processors executing computer instructions or circuits which function as the following unit: a control unit configured to disable the operation of the access point in the first communication method until a response indicating that software of the information processing apparatus meets the capability is received from the information processing apparatus using the second communication method, and to enable and switch to the operation of the access point in the first communication method after the response is received.

11. A control method of an information processing apparatus that is connectable to an electronic apparatus using a first communication method or a second communication method, wherein the electronic apparatus is capable of operating as an access point which is connectable using the first communication method and has no gateway function to an Internet during connection using the first communication method, the control method comprising: receiving, from the electronic apparatus using the second communication method, information indicating a capability of software that is needed for communication with the electronic apparatus using the first communication method; determining whether or not software of the information processing apparatus meets the capability; transmitting to the electronic apparatus, if it is determined that the software of the information processing apparatus meets the capability, a response to operate the electronic apparatus as the access point which is connectable using the first communication method; acquiring, if it is determined that the software of the information processing apparatus does not meet the capability, software that meets the capability from a server on the Internet using a third communication method without transmitting the response to the electronic apparatus by the transmitting unit so as not to operate the electronic apparatus as the access point; and enabling and switching to the communication with the electronic apparatus using the first communication method after the software that meets the capability is acquired using a communication method that is different than the first communication method.

12. A control method of an information processing apparatus that is connectable to an electronic apparatus using a first communication method or a second communication method, wherein the electronic apparatus is capable of operating as an access point which is connectable using the first communication method and has no gateway function to an Internet during connection using the first communication method, the control method comprising: receiving, from the electronic apparatus, information indicating a capability of software that is needed for communication with the electronic apparatus using the second communication method; determining whether or not software of the information processing apparatus meets the capability; transmitting to the electronic apparatus, if it is determined that the software of the information processing apparatus meets the capability, a response to operate the electronic apparatus as the access point which is connectable using the first communication method; acquiring, if it is determined that the software of the information processing apparatus does not meet the capability, software that meets the capability from a server on the Internet using the second communication method without transmitting the response to the electronic apparatus by the transmitting unit so as not to operate the electronic apparatus as the access point; and enabling and switching to the communication with the electronic apparatus using the first communication method after the software that meets the capability is acquired using a communication method that is different than the first communication method.

13. A control method of an electronic apparatus capable of operating as an access point which is connectable to an information processing apparatus using a first communication method and has no gateway function to an Internet during connection using the first communication method, the method comprising: transmitting, to the information processing apparatus using a second communication method, information indicating a capability of software that is needed for communication with the electronic apparatus using the first communication method; and disabling the operation of the access point until a response indicating that software of the information processing apparatus meets the capability is received from the information processing apparatus using the second communication method, and enabling the operation of the access point after the response is received using a communication method that is different than the first communication method.

14. A non-transitory computer-readable storage medium storing a program for causing a computer to execute a control method of an information processing apparatus that is connectable to an electronic apparatus using a first communication method or a second communication method, wherein the electronic apparatus is capable of operating as an access point which is connectable using the first communication method and has no gateway function to an Internet during connection using the first communication method, the control method comprising: receiving, from the electronic apparatus using the second communication method, information indicating a capability of software that is needed for communication with the electronic apparatus using the first communication method; determining whether or not software of the information processing apparatus meets the capability; transmitting to the electronic apparatus, if it is determined that the software of the information processing apparatus meets the capability, a response to operate the electronic apparatus as the access point which is connectable using the first communication method; acquiring, if it is determined that the software of the information processing apparatus does not meet the capability, software that meets the capability from a server on the Internet using a third communication method without transmitting the response to the electronic apparatus by the transmitting unit so as not to operate the electronic apparatus as the access point; and enabling and switching to the communication with the electronic apparatus using the first communication method after the software that meets the capability is acquired using a communication method that is different than the first communication method.

15. A non-transitory computer-readable storage medium storing a program for causing a computer to execute a control method of an information processing apparatus that is connectable to an electronic apparatus using a first communication method or a second communication method, wherein the electronic apparatus is capable of operating as an access point which is connectable using the first communication method and has no gateway function to an Internet during connection using the first communication method, the control method comprising: receiving, from the electronic apparatus, information indicating a capability of software that is needed for communication with the electronic apparatus using the second communication method; determining whether or not software of the information processing apparatus meets the capability; transmitting to the electronic apparatus, if it is determined that the software of the information processing apparatus meets the capability, a response to operate the electronic apparatus as the access point which is connectable using the first communication method; acquiring, if it is determined that the software of the information processing apparatus does not meet the capability, software that meets the capability from a server on the Internet using the second communication method without transmitting the response to the electronic apparatus by the transmitting unit so as not to operate the electronic apparatus as the access point; and enabling and switching to the communication with the electronic apparatus using the first communication method after the software that meets the capability is acquired using a communication method that is different than the first communication method.

16. A non-transitory computer-readable storage medium storing a program for causing a computer processor to execute a control method of an electronic apparatus capable of operating as an access point which is connectable using a first communication method, that is connectable to an information processing apparatus using a first communication method and has no gateway function to an Internet during connection using the first communication method, the control method comprising: transmitting, to the information processing apparatus via a second communication method, information indicating a capability of software that is needed for communication with the electronic apparatus using the first communication method; and disabling the operation of the access point until a response indicating that software of the information processing apparatus meets the capability is received from the information processing apparatus using the second communication method, and enabling the operation of the access point after the response is received using a communication method that is different than the first communication method.

* * * * *